(12) United States Patent
Puckett

(10) Patent No.: US 7,892,641 B2
(45) Date of Patent: Feb. 22, 2011

(54) SIZING COMPOSITIONS FOR GLASS FIBERS AND SIZED FIBER GLASS PRODUCTS

(75) Inventor: Garry D. Puckett, Salisbury, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 723 days.

(21) Appl. No.: 11/129,836

(22) Filed: May 16, 2005

(65) Prior Publication Data

US 2005/0255316 A1 Nov. 17, 2005

Related U.S. Application Data

(60) Provisional application No. 60/571,792, filed on May 17, 2004, provisional application No. 60/580,641, filed on Jun. 17, 2004.

(51) Int. Cl.
*B32B 9/00* (2006.01)

(52) U.S. Cl. .................. 428/391; 428/375; 428/392

(58) Field of Classification Search .............. None
See application file for complete search history.

(56) References Cited

U.S. PATENT DOCUMENTS

| | | | |
|---|---|---|---|
| 3,227,192 A | 1/1966 | Griffiths | |
| 3,265,516 A | 8/1966 | Triplett et at | |
| 4,002,445 A | 1/1977 | Graham | |
| 4,197,349 A * | 4/1980 | Walser | 428/378 |
| 4,244,844 A | 1/1981 | Molinier et al. | |
| 4,301,052 A | 11/1981 | Pollman | |
| 4,330,444 A | 5/1982 | Pollman | |
| 4,626,289 A * | 12/1986 | Hsu | 106/287.34 |
| 4,681,802 A | 7/1987 | Gaa et al. | |
| 4,981,754 A | 1/1991 | Hsu | |
| 5,085,938 A * | 2/1992 | Watkins | 428/378 |
| 5,466,528 A | 11/1995 | Girgis | |
| 5,629,400 A * | 5/1997 | Standke et al. | 528/38 |
| 5,662,776 A * | 9/1997 | Ushida et al. | 162/156 |
| 5,698,479 A | 12/1997 | Ogata et al. | |
| 5,954,869 A * | 9/1999 | Elfersy et al. | 106/287.16 |
| 5,959,014 A * | 9/1999 | Liebeskind et al. | 524/389 |
| 6,015,570 A * | 1/2000 | Tucci et al. | 424/403 |
| 6,120,587 A * | 9/2000 | Elfersy et al. | 106/18.35 |
| 6,221,944 B1 * | 4/2001 | Liebeskind et al. | 524/386 |
| 6,436,476 B1 | 8/2002 | Sage, Jr. | |
| 6,488,792 B2 | 12/2002 | Mathieu | |
| 6,514,612 B1 * | 2/2003 | Moireau et al. | 428/392 |
| 6,593,255 B1 | 7/2003 | Lawton et al. | |
| 6,696,155 B1 | 2/2004 | Takano et al. | |

FOREIGN PATENT DOCUMENTS

| | | |
|---|---|---|
| CN | 86 1 00604 A | 8/1987 |
| GB | 2 148 871 A | 6/1985 |
| GB | 2 187 446 A | 9/1987 |

OTHER PUBLICATIONS

K. Lowenstein, The Manufacturing Technology of Glass Fibres, (3d Ed. 1993) at pp. 30-44, 47-60, 115-122, 126-135, 238-241.
Examiner's Report dated Feb. 25, 2009 related to Canadian Patent Application No. 2,566,302.

* cited by examiner

*Primary Examiner*—Jill Gray
(74) *Attorney, Agent, or Firm*—Andrew C. Siminerio

(57) ABSTRACT

An embodiment of a sizing composition for glass fibers comprises a starch, a nonionic lubricant, and a silane comprising at least one amine and at least one aryl or arylene group. Embodiments of fiber glass strands comprise at least one glass fiber at least partially coated with a sizing composition of the present invention. Embodiments of fiber glass strands can have tensile strengths that make the fiber glass strands desirable for certain processes, applications, and/or end uses.

37 Claims, No Drawings

SIZING COMPOSITIONS FOR GLASS FIBERS AND SIZED FIBER GLASS PRODUCTS

CROSS REFERENCE TO RELATED APPLICATION

This application claims priority to, and incorporates by reference in full, the following co-pending applications of Applicant: U.S. Provisional Patent Application No. 60/571,792, filed May 17, 2004, entitled "Sizing Compositions for Glass Fibers and Sized Fiber Glass Products" and U.S. Provisional Patent Application No. 60/580,641, filed Jun. 17, 2004, entitled "Sizing Compositions for Glass Fibers and Sized Fiber Glass Products."

FIELD OF THE INVENTION

The present invention relates to sizing compositions for glass fibers and to fiber glass strands comprising a plurality of glass fibers at least partially coated with a sizing composition.

BACKGROUND OF THE INVENTION

Various chemical treatments exist for glass-type surfaces such as glass fibers to aid in their processability and applications. Before bundling the filaments together after formation, a coating composition or sizing composition is applied to at least a portion of the surface of the individual filaments to protect them from abrasion and to assist in processing. As used herein, the terms "sizing composition," "sizing," "binder composition," "binder," or "size" refer to a coating composition applied to the filaments immediately after forming. Sizing compositions can provide protection through subsequent processing steps, such as those where the fibers pass by contact points as in the winding of the fibers and strands onto a forming package, drying the aqueous-based or solvent-based sizing composition to remove the water or solvent, twisting from one package to a bobbin, beaming to place the yarn onto very large packages ordinarily used as the warp in a fabric, chopping in a wet or dry condition, roving into larger bundles or groups of strands, unwinding for use as a reinforcement, weaving, and other downstream processes.

In addition, sizing compositions can play a dual role when placed on fibers that reinforce polymeric matrices in the production of fiber-reinforced plastics or in the reinforcement of other materials. In the reinforcement of polymeric matrices, the sizing composition can provide protection and also can provide compatibility between the fiber and the matrix polymer or resin. For instance, glass fibers in the forms of both woven and nonwoven fabrics and mats and rovings and chopped strands have been used with resins, such as thermosetting and thermoplastic resins, for impregnation by, encapsulation by, or reinforcement of the resin. In such applications, it may be desirable to maximize the compatibility between the surface and the polymeric resin while also improving the ease of processability and manufacturability.

Glass fibers are sometimes coated with additional compositions after being coated with a sizing composition and prior to use as a reinforcement. For example, glass fibers are sometimes coated with a vinyl addition polymer such as polyvinyl chloride (PVC) to protect the glass fibers. For example, glass fibers can be used to reinforce a cementitious material. However, certain glass fibers (e.g., E-glass fibers) can deteriorate in the alkaline environment of a cementitious material. Thus, the glass fibers can be coated with PVC to minimize the damage which might result from reaction with an alkaline cementitious material.

When secondary coatings, such as PVC, are applied to glass fibers, the sizing composition can provide compatibility between the fiber and the secondary coating. A sizing composition can also provide strength to the glass fibers. Thus, the selection of a sizing composition for glass fibers is important to the performance of the glass fibers.

As mentioned above, glass fibers can be used as reinforcement for cementitious materials. An example of such a product is "cement board," in which a woven mesh of fiber glass strands is used to reinforce a cementitious material. In such products, the fiber glass strands are at least partially coated with a PVC plastisol prior to placement in the cementitious material. Cement board can be used in a number of ways, but is often used as a backerboard for ceramic tiles or bathroom fixtures.

An important property of fiber glass strands used in cement board is tensile strength. As used herein in connection with a fiber glass strand, whether coated with PVC or not, "tensile strength" refers to the amount of force required to break the strand.

It would be desirable to provide a fiber glass product coated with a sizing composition that has a number of desirable properties, including compatibility with PVC or other secondary coatings, a desirable tensile strength, a desirable strength when coated with PVC or another secondary coating, a desirable strength when used to reinforce a cementitious material, and/or other properties.

SUMMARY

Embodiments of the present invention relate to: sizing compositions for glass fibers; fiber glass strands; meshes and fabrics of fiber glass strands; and cement boards reinforced with fiber glass strands.

In one embodiment, a sizing composition comprises a starch, a nonionic lubricant, and a silane comprising at least one amine and at least one aryl or arylene group.

In another embodiment, a sizing composition comprises a starch and a silane comprising at least one amine and at least one aryl or arylene group in an amount greater than about 2.5 percent by weight of the sizing composition on a total solids basis.

In another embodiment, a sizing composition comprises a starch in an amount greater than about thirty-five weight percent of the sizing composition on a total solids basis, a paraffin wax in an amount greater than about twenty weight percent of the sizing composition on a total solids basis, an oil in an amount greater than about five weight percent of the sizing composition on a total solids basis, and a silane comprising at least one amine and at least one aryl or arylene group in an amount greater than about eight weight percent of the sizing composition on a total solids basis.

Silanes comprising at least one amine and at least one aryl or arylene group useful in embodiments of the present invention can further be characterized in a number of ways. In some embodiments, the silane can comprise at least one benzyl group or at least one phenyl group. The silane, in some embodiments, can have terminal unsaturation. The silane can comprise at least one primary or secondary amine and can further comprise additional primary amines, additional secondary amines, and/or tertiary amines in some embodiments. In some embodiments, the silane can comprise two or more amines. The silane, in some embodiments, can comprise two or more secondary amines. The silane, in some embodiments, can comprise a benzylamine or a phenylamine. The silane, for example, can comprise a benzylamino group or a phenylamino group in some embodiments. The silane comprising a benzylamino group or phenylamino group, in some embodiments, can further comprise terminal unsaturation. The silane can comprise a benzylamino group or phenylamino group in some embodiments. The silane comprising a benzylamino group or phenylamino group, in some embodiments, can further comprise terminal unsaturation.

Some embodiments of sizing compositions of the present invention can comprise one or more nonionic lubricants. In some embodiments comprising two or more lubricants, a first nonionic lubricant can comprise wax, and the second nonionic lubricant can comprise oil.

Some embodiments of sizing compositions of the present invention can further comprise other components including, without limitation, emulsifying agents, non-starch film formers, cationic lubricants, anti-foaming agents, anti-static agents, biocides, and others, and various combinations of such components.

Embodiments of fiber glass strands can comprise at least one glass fiber at least partially coated with an embodiment of a sizing composition of the present invention. Embodiments of fiber glass strands can have tensile strengths that make the fiber glass strands desirable for certain processes, applications, and/or end uses.

These and other embodiments of the present invention are described in greater detail in the detailed description of the invention which follows.

DETAILED DESCRIPTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to any claims that might be filed in applications claiming priority to this application, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Further, when the phrase "up to" is used in connection with an amount of a component, material, or composition in the claims, it is to be understood that the component, material, or composition is present in at least a detectable amount (e.g., its presence can be determined) and may be present up to and including the specified amount.

The present invention relates to new sizing compositions for fiber glass. As used herein, the term "sizing composition" refers to a coating composition applied to fiber glass filaments immediately after forming and may be used interchangeably with the terms "binder composition," "binder," "sizing," and "size." The sizing compositions described herein generally relate to aqueous sizing compositions. In non-limiting embodiments, the sizing compositions are useful on fiber glass to be at least partially coated with polyvinyl chloride (PVC). In non-limiting embodiments, the sizing compositions are useful on fiber glass to be at least partially coated with PVC for use in cement board applications. Other non-limiting embodiments of the present invention relate to fiber glass strands coated with the sizing compositions. Other non-limiting embodiments of the present invention relate to products that incorporate fiber glass strands.

The present invention will be discussed generally in the context of its use in the production, assembly, and application of glass fibers. However, one of ordinary skill in the art would understand that the present invention may be useful in the processing of other textile materials.

Persons of ordinary skill in the art will recognize that the present invention can be implemented in the production, assembly, and application of a number of glass fibers. Non-limiting examples of glass fibers suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof. Typical formulations of glass fibers are disclosed in K. Loewenstein, *The Manufacturing Technology of Continuous Glass Fibres*, (3d Ed. 1993). The present invention is particularly useful in the production, assembly, and application of glass fibers prepared from E-glass compositions.

Embodiments of fiber glass strands of the present invention can have several desirable properties. For example, embodiments of fiber glass strands can be at least partially coated with a sizing composition that results in the at least partially coated fiber glass strand being compatible with polyvinyl chloride and other vinyl addition polymers, while exhibiting desirable vinyl compatibility, desirable tensile strengths (both coated and uncoated), and desirable alkaline resistance, as well as other properties. The desired level of a particular property may depend on the application or end use. For example, relatively high tensile strength may be desirable in applications where the fiber glass stands reinforce another material.

Embodiments of the present invention provide fiber glass strands having tensile strengths that make the fiber glass strands desirable for certain processes, applications, and/or end uses. In one embodiment of the present invention, a fiber glass strand comprises at least one glass fiber at least partially coated with a sizing composition of the present invention.

Embodiments of fiber glass strands of the present invention can have uncoated tensile strengths that may be desirable for certain processes, applications, and/or end uses. As used herein, "uncoated tensile strength" refers to the tensile strength of the strand after at least partially coating the at least one glass fiber in the strand with a sizing composition, but prior to application of a secondary coating composition. As used herein, the term "secondary coating composition" refers to a composition applied secondarily, after an initial sizing composition has been applied and after the initial sizing composition has dried. Secondary coating compositions can be applied for a number of reasons including to increase the tensile strength of the strand. Examples of secondary coating compositions can include vinyl addition polymers such as PVC, PVC plastisols, and PVC thermoplastic compounds.

All references to uncoated tensile strength in the present invention should be understood to refer to the tensile strength of a fiber glass strand measured using Standard D2256-02 published by ASTM International of West Conshohocken, Pa., which is hereby incorporated by reference. ASTM D2256-02 is entitled "Standard Test Method for Tensile Properties of Yarns by the Single-Strand Method," and may be ordered from ASTM International.

In embodiments of the present invention, the fiber glass strand can have an uncoated tensile strength of about nine pounds or more as measured by ASTM D2256-02. The fiber glass strand, in some embodiments, can have an uncoated tensile strength of about ten pounds or more as measured by ASTM D2256-02. The fiber glass strand can have an uncoated tensile strength of about eleven pounds or more in some embodiments as measured by ASTM D2256-02.

In one embodiment, a sizing composition of the present invention can comprise a starch, a nonionic lubricant, and a coupling agent comprising at least one amine and at least one aryl or arylene group. The coupling agent, in some embodiments, can comprise a silane comprising at least one amine and at least one aryl or arylene group.

In another embodiment, a sizing composition can comprise a starch and a silane comprising at least one amine and at least one aryl or arylene group in an amount greater than about 2.5 percent by weight of the sizing composition on a total solids basis.

Silanes comprising at least one amine and at least one aryl or arylene group useful in embodiments of the present invention can further be characterized in a number of ways. In some embodiments, the silane can comprise at least one benzyl group or at least one phenyl group. The silane, in some embodiments, can have terminal unsaturation. The silane, in some embodiments, can comprise at least one primary or secondary amine and can further comprise additional primary amines, additional secondary amines, and/or tertiary amines. In some embodiments, the silane can comprise two or more amines. The silane, in some embodiments, can comprise two or more secondary amines.

The silane, in some embodiments, can comprise a benzylamine or a phenylamine. The silane, for example, can comprise a benzylamino group or a phenylamino group. The silane comprising a benzylamino group or phenylamino group, in some embodiments, can further comprise terminal unsaturation. In further embodiments, a silane comprising a benzylamino group and terminal unsaturation can comprise n-2-(vinylbenzylamino)-ethyl-3-aminopropyltrimethoxysilane.

In some embodiments, the coupling agent can comprise greater than 2.5 percent by weight of the sizing composition on a total solids basis in some embodiments. The coupling agent can comprise greater than five (5) percent by weight of the sizing composition on a total solids basis in some embodiments. The coupling agent, in some embodiments, can comprise greater than eight (8) percent by weight of the sizing composition on a total solids basis. In some embodiments, the coupling agent can comprise greater than ten (10) percent by weight of the sizing composition on a total solids basis.

As described below, some embodiments of sizing compositions of the present invention can comprise other components including, without limitation, nonionic lubricants, emulsifying agents, non-starch film-formers, cationic lubricants, anti-foaming agents, anti-static agents, biocides, and others.

Turning now to the components of embodiments of sizing compositions of the present invention, sizing compositions of the present invention can comprise a coupling agent comprising at least one amine and at least one aryl or arylene group. The coupling agent can comprise a silane in embodiments of the present invention, such that the silane comprises at least one amine and at least one aryl or arylene group. Coupling agents typically have multiple functions. In embodiments where the coupling agent comprises an organo-silane, at least one of the silicon atoms has attached to it one or more groups which can react with the glass fiber surface or otherwise be chemically attracted, but not necessarily bonded, to the glass fiber surface. In embodiments where the glass fibers are to be at least partially coated with a secondary coating composition, the coupling agent may also interact with the secondary coating composition or a component of the secondary coating composition, such that the coupling agent facilitates adhesion between the glass fibers and the secondary coating compositions. Coupling agents can also be used to interact with a resin or resins that may be used in an end product, such that the coupling agent can facilitate adhesion between the glass fibers and the resin or resins.

In embodiments of the present invention, a silane used as a coupling agent can comprise at least one primary or secondary amine and at least one aryl group or arylene group. The silane, in some embodiments, can further comprise additional primary amines, additional secondary amines, and/or tertiary amines. In some embodiments, the silane can comprise two or more secondary amines.

As used herein, "aryl group" refers to a group derived from an arene by removal of a hydrogen atom from a ring carbon atom. As used herein, "arylene group" refers to a bivalent group derived from an arene by removal of a hydrogen atom from two ring carbon atoms. As used herein, "arene" refers to a monocyclic or polycyclic aromatic hydrocarbon. Examples of arenes can include, without limitation, benzene and naphthalene. Examples of aryl groups can include without limitation, benzyl groups and phenyl groups. Examples of arylene groups can include, without limitation, vinyl benzyl groups.

Examples of silanes comprising at least one amine and at least one aryl group can comprise, without limitation, silanes comprising benzylamines and silanes comprising phenylamines. Silanes comprising benzylamines can comprise, in some embodiments, a silane comprising a benzylamino group. An example of a commercially available silane comprising a benzylamino group is DYNASYLAN® 1161 N-benzyl-N-aminoethyl-3-aminopropyltrimethoxysilane from Degussa AG of Dusseldorf, Germany, which has the following structure:

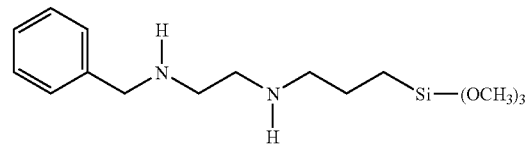

DYNASYLAN® 1161 comprises two secondary amines. Silanes comprising phenylamines can comprise, in some embodiments, a silane comprising a phenylamino group. An example of a commercially available silane comprising a phenylamino group is commercially available from GE Advanced Materials of Tarrytown, N.Y. as SILQUEST® Y-9669, which is N-phenyl-3-aminopropyltrimethoxysilane having the following structure:

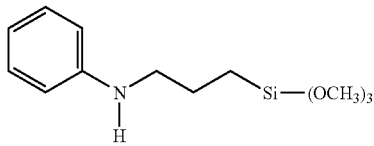

SILQUEST® Y-9669 comprises one secondary amine.

Another example of a commercially available silane useful in embodiments of the present invention is commercially available from GE Advanced Materials of Tarrytown, N.Y. as SILQUEST® A-1128. While the complete structure of SILQUEST® A-1128 is not publicly available, SILQUEST® A-1128 is understood to comprise a benzyl group and one or more amines.

Examples of silanes comprising at least one amine and at least one arylene group can include, without limitation, silanes comprising vinylbenzylamines. A silane comprising a vinylbenzylamine can comprise a silane comprising a vinylbenzylamino group. An example of a commercially available silane comprising a vinylbenzylamino group is DYNASYLAN® 1172 N-2-(vinylbenzylamino)-ethyl-3-aminopropyltrimethoxysilane from Degussa AG of Dusseldorf, Germany, which has the following structure:

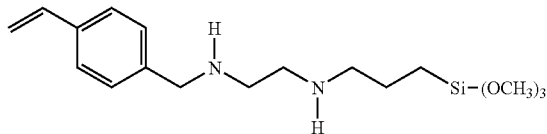

Another example of a commercially available silane comprising a vinylbenzylamino group is Z-6032 N-2-(vinylbenzylamino)-ethyl-3-aminopropyltrimethoxysilane from Dow Corning. DYNASYLAN 1172 is provided in acetic acid while Z-6032 is provided in hydrochloric acid.

In embodiments of the present invention, a silane comprising at least one amine and at least one aryl or arylene group can have terminal unsaturation. As used herein, "terminal unsaturation" means that the silane includes at least one organo-functional group having a carbon-carbon double bond. An example of a silane having terminal unsaturation is a silane comprising a vinylbenzyl group.

The use of a silane comprising at least one amine and at least one aryl or arylene group in some embodiments of sizing compositions of the present invention was found to increase the tensile strength of fiber glass strands at least partially coated with such sizing compositions when compared to fiber glass strands coated with sizing compositions including silanes that do not include an amine and/or do not include an aryl or arylene group. As noted above, fiber glass strands coated with sizing compositions of the present invention are sometimes later coated with a secondary coating composition. The use of silanes comprising at least one amine and at least one aryl or arylene group in sizing compositions of the present invention to at least partially coat fiber glass strands is also believed to increase the tensile strength of such strands after the strands are coated with a secondary coating composition as compared to similar strands that are coated with sizing compositions including silanes that do not include amines and/or do not include an aryl or arylene group. Such increases in tensile strength are believed to occur when the sized fiber glass strands are coated with a secondary coating composition that comprises polyvinylchloride (e.g., PVC). Such increases in tensile strength are examples of improvements exhibited by some embodiments of the present invention, and such embodiments can exhibit other improvements as well.

As to the amount of the coupling agent in embodiments of sizing compositions of the present invention, a silane comprising at least one amine and at least one aryl or arylene group comprises greater than 2.5 percent by weight of the sizing composition on a total solids basis in some embodiments. In other embodiments, the silane comprising at least one amine and at least one aryl or arylene group comprises greater than five (5) weight percent of the sizing composition on a total solids basis. Increasing the amount of coupling agent used in embodiments of sizing compositions of the present invention is believed to increase the tensile strengths of fiber glass strands both prior to and after coating the sized strands with secondary coating compositions. The use of a coupling agent in amounts of eight (8) percent by weight or greater based on a total solids basis of the sizing composition can result in fiber glass strands having a tensile strength that is particularly suitable for some applications, such as reinforcing cement board. Thus, silane comprising at least one amine and at least one aryl or arylene group, in some embodiments, can comprise greater than about eight (8) percent by weight of the sizing composition on a total solids basis. In embodiments where particularly high tensile strength is desired, the silane comprising at least one amine and at least one aryl or arylene group can comprise greater than about ten (10) percent by weight of the sizing composition on a total solids basis.

Embodiments of sizing compositions of the present invention can further comprise a starch. The starch component of the sizing composition of the present invention can be used to provide a film forming character and to bind the glass fibers together into a strand in order that the strand will have enough integrity to withstand subsequent processing steps. The starch component can be any water soluble starch such as dextrin, and any water insoluble starch, such as amylose, and the starch can be from the commercially available starches such as those derived from corn, potato, wheat, sago, tapioca and arrow root which can be modified by crosslinking. Examples of starches that can be used in embodiments of the present invention include those having a low amylose content, which means that the starch composition can contain up to about forty (40) weight percent amylose in the starch in some embodiments, and between about ten (10) and about thirty (30) weight percent in other embodiments. Starches useful in some embodiments of the present invention can utilize a mixture of modified potato and crosslinked corn starches both with a low amylose content. An example of a starch useful in embodiments of the present invention is CATO 75 cationic starch from National Starch and Chemical Co. Other examples of starches useful in embodiments of the invention can include, without limitation, Amaizo 213 starch manufactured by the American Maize Products Company and National 1554 manufactured by National Starch Company. Another example of a suitable starch is a low amylose starch that is water soluble after cooking such as a potato starch ether that is nonionic like that available from Avebe b.a. 9607 PT Foxhol, The Netherlands under the trade designation "Kollotex 1250."

Additional types of starches that can be used are given in K. Loewenstein, *The Manufacturing Technology of Glass*

Fibres, (3d Ed. 1993) at pages 238-41. Other suitable starches include those described in U.S. Pat. Nos. 3,227,192; 3,265,516 and 4,002,445.

The amount of starch utilized in some non-limiting embodiments of the present invention can be an effective film-forming amount of starch. In some non-limiting embodiments, the amount of starch can comprise up to fifty (50) weight percent of the sizing composition based on total solids. In other non-limiting embodiments, the amount of starch can comprise up to forty-five weight (45) percent of the sizing composition based on total solids. In other non-limiting embodiments, the amount of starch can comprise greater than thirty (30) weight percent of the sizing composition based on total solids. In some non-limiting embodiments, including embodiments for at least partially coating fiber glass strands for use in cement board applications, the amount of starch can comprise more than thirty-eight (38) weight percent of the sizing composition based on total solids. The sizing composition, in non-limiting embodiments, can comprise up to forty-two (42) weight percent starch based on total solids.

Embodiments of sizing compositions of the present invention can also comprise one or more nonionic lubricants. Nonionic lubricants useful in some embodiments of the present invention may advantageously reduce yarn friction, increase lubrication, protect against glass-to-contact point abrasion during manufacture and in downstream processing (e.g., at a customer of a fiber glass manufacturer), etc. For example, nonionic lubricants useful in some embodiments of the present invention may reduce fiber to metal friction during manufacture and processing. Nonionic lubricants useful in embodiments of the present invention can generally be selected using techniques known to those of skill in the art.

In some non-limiting embodiments, the nonionic lubricant can comprise one or more oils. In selecting an oil for use in non-limiting embodiments of the present invention, compatibility with the other components of the sizing composition is an important consideration. Examples of oils suitable for use in embodiments of the present invention can include, without limitation, triglyceride oils and partially hydrogenated oils based on palm, coconut, soybean, corn etc. An example of a commercially available soybean oil useful in embodiments of the present invention is CT 7000 soybean oil from C & T Refinery, Inc. of Charlotte, N.C. Palm oil useful in embodiments of the present invention is commercially available from C & T Refinery, Inc. of Charlotte, N.C. An example of a commercially available corn oil useful in embodiments of the present invention is Pureco Oil K22 from Abitec Corporation of Columbus, Ohio.

In some non-limiting embodiments, the amount of oil can comprise up to forty (40) weight percent of the sizing composition based on total solids. In other non-limiting embodiments, the amount of oil can comprise up to twenty (20) weight percent of the sizing composition based on total solids. In non-limiting embodiments, the amount of oil can comprise up to ten (10) weight percent of the sizing composition based on total solids. In non-limiting embodiments, the amount of oil can comprise greater than five (5) weight percent of the sizing composition based on total solids.

In some non-limiting embodiments, the nonionic lubricant can comprise one or more waxes. Examples of waxes suitable for use in the present invention include polyethylene wax, paraffin wax, polypropylene wax, microcrystalline waxes, and oxidized derivatives of these waxes. An example of a paraffin wax suitable for use in embodiments of the present invention is PACEMAKER P30 commercially available from CITGO Petroleum Corporation. Other examples of paraffin waxes suitable for use in embodiments of the present invention include, without limitation, Elon PW paraffin wax from Elon Specialties of Concord, N.C. and Michem Lube 723 from Michelman, Inc. of Cincinnati, Ohio.

In some non-limiting embodiments, the amount of wax can comprise up to thirty (30) weight percent of the sizing composition based on total solids. In other non-limiting embodiments, the amount of wax can comprise up to about twenty-five (25) weight percent of the sizing composition based on total solids. In other non-limiting embodiments, the amount of wax can comprise greater than ten (10) weight percent of the sizing composition based on total solids. In some non-limiting embodiments, the amount of wax can comprise greater than twenty (20) weight percent of the sizing composition based on total solids.

In some non-limiting embodiments, sizing compositions of the present invention can comprise two or more nonionic lubricants. The sizing composition can comprise an oil and a wax in some non-limiting embodiments. The use of both an oil and a wax can be useful in obtaining desirable strand lubrication and can act as a processing aid to reduce abrasion of the strand with contact points during manufacture.

The oils and waxes useful in such embodiments can include those described above. The amount of oil and wax used in embodiments of the present invention can depend on a number of factors including, without limitation, the amount needed to sufficiently reduce fiber to metal friction during manufacture and processing, compatibility with the other components of the sizing composition, the ease with which the oil and/or wax can be dispersed in an aqueous sizing composition, the costs of components, the applications in which the coated fiber glass strand may be used, and others. In some non-limiting embodiments of sizing compositions that include oil and wax, the amount of wax can comprise up to thirty (30) weight percent of the sizing composition based on total solids, and the amount of oil can comprise up to forty (40) weight percent of the sizing composition based on total solids. In other non-limiting embodiments, the amount of wax can comprise up to twenty-five (25) weight percent of the sizing composition based on total solids, and the amount of oil can comprise up to twenty (20) weight percent of the sizing composition based on total solids. In other non-limiting embodiments, the amount of wax can comprise up to twenty-five (25) weight percent of the sizing composition based on total solids, and the amount of oil can comprise up to ten (10) weight percent of the sizing composition based on total solids.

Non-limiting embodiments of sizing compositions of the present invention can also comprise one or more emulsifying agents. Emulsifying agents can assist in dispersing hydrophobic materials, such as oils and waxes, in water or an aqueous solution. Emulsifying agents can also assist in emulsifying or dispersing components of the sizing compositions, such as oil or wax when used as a nonionic lubricant. Non-limiting examples of suitable emulsifying agents can include polyoxyalkylene block copolymers, ethoxylated alkyl phenols, polyoxyethylene octylphenyl glycol ethers, ethylene oxide derivatives of sorbitol esters, polyoxyethylated vegetable oils, ethoxylated alkylphenols, and nonylphenol surfactants. Examples of commercially available emulsifying agents useful in embodiments of the present invention can include TMAZ 81, which is an ethylene oxide derivative of a sorbitol ester and which is commercially available from BASF Corp. of Parsippany, N.J.; ICONOL OP-10, which is an alkoxylated alkyl (specifically, a phenol ethylene oxide adduct of octylphenol) and which is commercially available from BASF Corp.; MACOL OP-10 ethoxylated alkylphenol from BASF Corp.; TRITON X-100 from Rohm and Haas; and IGEPAL CA-630 from Rhone-Poulenc.

As indicated above, embodiments of the present invention can utilize one or more emulsifying agents. Multiple emulsifying agent can be used in some embodiments to assist in providing a more stable emulsion. Multiple emulsifying agents can be used in amounts effective to disperse hydrophobic components, such as oil and wax, in water or an aqueous solution. In some non-limiting embodiments of sizing compositions that include one or more emulsifying agents, the total amount of emulsifying agents can comprise up to ten (10) weight percent of the sizing composition based on total solids. In other non-limiting embodiments, the total amount of emulsifying agents can comprise up to five (5) weight percent of the sizing composition based on total solids. In other non-limiting embodiments, the total amount of emulsifying agents can comprise up to 4.5 weight percent of the sizing composition based on total solids.

Embodiments of sizing compositions of the present invention can comprise a non-starch film former. The presence of a non-starch film former can assist the starch in providing an effective amount of film former by its ability to tack bond the filaments or fibers together at various contact points along the fibers. Such non-starch film-formers can include, without limitation, the polyvinyl pyrrolidone ("PVP") homopolymers and copolymers of PVP, polyvinyl acetate, and polyvinyl alcohol, epoxy resins, polyesters and the like. Examples of suitable polyvinyl pyrrolidones include, without limitation, PVP K-15, PVP K-30, PVP K-60 and PVP K-90, each of which are commercially available from ISP Chemicals of Wayne, N.J. An alternative to PVP can be low molecular weight polyvinyl acetates since they can also provide a softer film on the surface of the glass fiber bundles.

Generally, the non-starch film former is present in effective amounts along with the starch to provide an effective cover for the fiber glass strand and to provide effective strand integrity, such that the integrity can be maintained when the strand is dried and subsequently processed. The non-starch film former, in embodiments of the present invention, can be present in an amount less than the amount of starch present in the sizing composition. In non-limiting embodiments, the amount of non-starch film former can comprise up to ten (10) weight percent of the sizing composition based on total solids. In other non-limiting embodiments, the amount of non-starch film former can comprise up to eight (8) weight percent of the sizing composition based on total solids. In other non-limiting embodiments, the amount of non-starch film former can comprise greater than one (1) weight percent of the sizing composition based on total solids.

Embodiments of sizing composition of the present invention can further comprise a cationic lubricant. Cationic lubricants can be used in embodiments of the present invention, for example, to assist with internal lubrication, such as by reducing filament-to-filament or glass-to-glass abrasion. In general, most cationic lubricants known to those of skill in the art can be used in embodiments of the present invention. Non-limiting examples of cationic lubricants suitable in the present invention include lubricants with amine groups, lubricants with alkyl imidazoline derivatives (such as can be formed by the reaction of fatty acids with polyalkylene polyamines), lubricants with ethoxylated amine oxides, and lubricants with ethoxylated fatty amides. A non-limiting example of a lubricant with an amine group is a modified polyethylene amine, e.g. EMERY 6717, which is a partially amidated polyethylene imine commercially available from Cognis Corporation of Cincinnati, Ohio. Another example of a cationic lubricant useful in embodiments of the present invention is ALUBRASPIN 261, which is an alkyl imidazoline derivative commercially available from BASF Corp. Another example of a cationic lubricant useful in embodiments of the present invention is ALUBRASPIN 226, which is a partially amidated polyethylene imine commercially available from BASF Corp. of Parsippany, N.J. Other examples of cationic lubricants useful in non-limiting embodiments of the present invention can include EMERY 6760, which is commercially available from Cognis Corporation and CATION X, which is commercially available from Rhone Poulenc of Princeton, N.J.

In non-limiting embodiments of a sizing composition utilizing a cationic lubricant, the amount of cationic lubricant can comprise up to ten (10) weight percent of the sizing composition based on total solids. In other non-limiting embodiments, the amount of cationic lubricant can comprise up to eight (8) weight percent of the sizing composition based on total solids. In further non-limiting embodiments, the amount of cationic lubricant can comprise up to six (6) weight percent of the sizing composition based on total solids. Cationic lubricant can be used in an amount to assist with internal lubrication of fiber glass strands. In non-limiting embodiments, cationic lubricant can comprise greater than one (1) weight percent of the sizing composition on a total solids basis.

Embodiments of the present invention can comprise a second cationic lubricant, which can also assist with internal lubrication. In addition to the lubricants listed above, another lubricant which can be present in non-limiting embodiments of the sizing composition is a polyamide resin. A non-limiting example of such a lubricant is VERSAMID 140 polyamide resin, which is commercially available from Cognis Corp. of Cincinnati, Ohio.

Using a cationic lubricant and a polyamide resin can be useful in at least partially coating fiber glass strands for certain applications, such as reinforcing cement board. In embodiments of the present invention that comprise a cationic lubricant and a polyamide resin, the polyamide resin can comprise up to ten (10) weight percent of the sizing composition based on total solids. In non-limiting embodiments, the amount of polyamide resin can comprise up to eight (8) weight percent of the sizing composition based on total solids. In non-limiting embodiments, the amount of polyamide resin can comprise greater than five (5) weight percent of the sizing composition based on total solids.

In some embodiments, a polyamide resin, such as VERSAMID 140 resin, can be used as the only cationic lubricant in the sizing composition. The polyamide resin can be used in an amount sufficient to assist with internal lubrication in some embodiments. In some embodiments, the polyamide resin can comprise up to fifteen (15) weight percent of the sizing composition based on total solids. In other non-limiting embodiments, the amount of polyamide resin can comprise between greater than six (6) weight percent of the sizing composition based on total solids. In other non-limiting embodiments, the amount of polyamide resin can comprise greater than eight (8) weight percent of the sizing composition based on total solids. The amount of polyamide resin, in non-limiting embodiments, can comprise up to twelve (12) weight percent of the sizing composition based on total solids.

Embodiments of sizing compositions of the present invention can comprise other components including, without limitation, anti-foaming agents, anti-static agents, biocides, and others. A biocide can be added as a precautionary measure to preclude potential problems associated with yeast, mold, aerobic bacteria, and other biological products. Any biocides known to those skilled in the art to control organic growth in sizing compositions for glass fibers can be used in sizing compositions of the present invention. Non-limiting examples of biocides that can be used in the present invention include organotin biocides, methylene thiocyanate biocides, and chlorinated compounds. An example of a methylene thiocyanite biocide is CL-2141 biocide, which is a water-based MBT (methylene-bis-thiocyanate) manufactured by ChemTreat Inc. In some non-limiting embodiments, the amount of biocide can comprise up to five (5) weight percent of the sizing composition based on total solids. In other non-limiting embodiments, the amount of biocide can comprise up to two (2) weight percent of the sizing composition based on total solids.

Anti-foaming agents and anti-static agents can be used in non-limiting embodiments of the present invention to control foaming of the sizing composition and to reduce static in the fiber glass strands. A non-limiting example of an anti-foaming agent suitable for use in embodiments of the present invention is MAZU DF-136 (also known as INDUSTROL DF-136) antifoaming agent, which is commercially available from BASF Corp. of Parsippany, N.J. A non-limiting example of an anti-static agent suitable for use in embodiments of the present invention is KATAX 6661-A anti-static agent, which is commercially available from Cognis Corporation.

In embodiments of the present invention, a sizing composition can comprise up to fifty (50) weight percent starch, up to seventy (70) weight percent nonionic lubricant, and greater than five (5) weight percent coupling agent comprising at least one amine and at least one aryl or arylene group, on a total solids basis based on the total weight of the sizing composition. In further embodiments, the nonionic lubricant can comprise oil and wax, and the oil can comprise up to about forty (40) weight percent of the sizing composition and the wax can comprise up to about thirty (30) weight percent of the sizing composition. In further embodiments, the sizing composition can comprise an emulsifying agent, a non-starch film former, a cationic lubricant, an anti-foaming agent, an anti-static agent, and/or a biocide.

In other non-limiting embodiments, a sizing composition of the present invention can comprise a starch in an amount up to forty-five (45) weight percent of the sizing composition on a total solids basis; a wax in an amount up to twenty-five (25) weight percent of the sizing composition on a total solids basis; an oil in an amount up to twenty (20) weight percent of the sizing composition on a total solids basis; and a coupling agent comprising at least one amine and at least one aryl or arylene group in an amount greater than eight (8) weight percent of the sizing composition on a total solids basis. In further non-limiting embodiments, the sizing composition can comprise an emulsifying agent, a non-starch film former, a cationic lubricant, an anti-foaming agent, an anti-static agent, and/or a biocide.

In other non-limiting embodiments, a sizing composition of the present invention can comprise a starch in an amount between thirty (30) and forty-five (45) weight percent of the sizing composition on a total solids basis; a wax in an amount between ten (10) and twenty-five (25) weight percent of the sizing composition on a total solids basis; an oil in an amount up to about ten (10) weight percent of the sizing composition on a total solids basis; and a coupling agent comprising at least one amine and at least one aryl or arylene group in an amount greater than eight (8) weight percent of the sizing composition on a total solids basis. In further non-limiting embodiments, the sizing composition can comprise an emulsifying agent, a non-starch film former, a cationic lubricant, an anti-foaming agent, an anti-static agent, and/or a biocide.

Non-limiting embodiments of a sizing composition of the present invention can comprise a starch in an amount greater than thirty-five (35) weight percent of the sizing composition on a total solids basis; a paraffin wax in an amount greater than twenty (20) weight percent of the sizing composition on a total solids basis; an oil in an amount greater than five (5) weight percent of the sizing composition on a total solids basis; and a silane comprising a benzylamino group in an amount greater than about eight (8) weight percent of the sizing composition on a total solids basis.

The present invention also relates to fiber glass strands comprising at least one glass fiber at least partially coated with an embodiment of a sizing composition of the present invention. Glass fibers are produced by flowing molten glass via gravity through a multitude of small openings in a precious metal device, called a bushing. After the fibers have cooled very shortly after their issuance from the bushing and usually in close proximity to the bushing, these fibers are at least partially coated with a sizing composition of the present invention. The sizing composition can be applied by sprayers, rollers, belts, metering devices, or other similar application devices. The sized glass fibers are gathered into strands comprising a plurality of individual fibers, generally from 200 to more than 4000.

After their formation and treatment, the strands are typically wound into a "forming package." The strands can be wound onto a paper or plastic tube using a winder. The forming packages are usually dried in either an oven or at room temperature to remove some of the moisture from the fibers. Additional information related to fiberizable glass compositions and methods of making glass filaments are disclosed in K. Loewenstein, *The Manufacturing Technology of Glass Fibres*, (3d Ed. 1993) at pages 30-44, 47-60, 115-122 and 126-135, which are hereby incorporated by reference. For certain uses, the strands are then typically wound onto a bobbin via conventional textile twisting techniques such as a twist frame.

The amount of sizing composition on the strand may be measured as "loss on ignition" or "LOI". As used herein, the term "loss on ignition" or "LOI" means the weight percent of dried sizing composition present on the fiber glass as determined by Equation 1:

$$LOI=100\times[(W_{dry}-W_{bare})/W_{dry}]$$ (Eq. 1)

wherein $W_{dry}$ is the weight of the fiber glass plus the weight of the coating after drying in an oven at 220° F. (about 104° C.) for 60 minutes, and $W_{bare}$ is the weight of the bare fiber glass after heating the fiber glass in an oven at 1150° F. (about 621° C.) for 20 minutes and cooling to room temperature in a dessicator.

In general, although not limiting, the loss on ignition (LOI) of embodiments of fiber glass strands of the present invention may be up to 2.5 percent. In other non-limiting embodiments, the LOI can be up to 2 percent. In further non-limiting embodiments, the LOI can be up to 1.5 percent. At lower LOI levels, the broken filament levels of a fiber glass product can increase. However, increasing the LOI increases production costs. Thus, in non-limiting embodiments, the LOI can be between 0.5 and 1.5 weight percent.

In non-limiting embodiments, a fiber glass strand of the present invention can comprise between twenty (20) and ten thousand (10,000) filaments per strand. In other non-limiting embodiments, a fiber glass strand of the present invention can comprise between two hundred (200) and four thousand five hundred (4,500) filaments per strand. The strands, in non-limiting examples, can be from fifty yards per pound to more than ten thousand yards per pound depending on the application.

The diameter of the filaments used in non-limiting embodiments of fiber glass strands of the present invention can be between, in general, between five (5) and eighty (80) microns. In some non-limiting embodiments, the diameter of the filaments can be between seven (7) and eighteen (18) microns.

Fiber glass strands at least partially coated with embodiments of sizing compositions of the present invention can be, for example, particularly compatible with polyvinyl chloride and other vinyl addition polymers. The fiber glass strands can be used in myriad forms in various ways with polymers like the vinyl addition polymers of polyvinyl chloride and plasticized polyvinyl chloride as in plastisol formulations. For example, fiber glass strands can be formed into woven or nonwoven mats for impregnation and/or encapsulation or coating by the polyvinyl chloride or plasticized polyvinyl chloride such as plastisols and organosols. The term "plastisol" is used in a manner consistent with its standard definition, that of a dispersion of a resin in a plasticizer. For example, a polyvinyl chloride plastisol is a uniform dispersion of a polyvinyl chloride resin in an appropriate plasticizer.

Woven and nonwoven mat formation can be accomplished by any method known to those skilled in the art. Traditionally, the woven mats or cloth are produced from twisted fiber glass strands. Embodiments of fiber glass strands of the present invention can be twisted on a twist frame using techniques known to those of skill in the art. The twisted strands are wound on bobbins. Twisted fiber glass strands can be woven into a fabric or laid down as scrim using techniques known to those of skill in the art. In some embodiments, a polymeric formulation can be applied to the individual strands prior to weaving or laying down as scrim, and in other embodiments, the polymeric formulation can be applied to the woven fabric or the scrim.

The impregnation, encapsulation, reinforcement and coating operations can be conducted by any method known to those skilled in the art with polymeric formulations like vinyl addition polymers and copolymers, such as polyvinyl chloride plastisols, known to those skilled in the art.

Embodiments of fiber glass strands of the present invention can be coated with a polyvinyl chloride plastisol and used to reinforce a cementitious material, such as cement board. Embodiments of sizing compositions of the present invention can provide compatibility between the glass fibers and the polyvinyl chloride. Embodiments of sizing compositions of the present invention can also provide improved tensile strength to the glass fibers, both prior to and after coating with polyvinyl chloride. Tensile strength of the fiber glass strands is important in the reinforcement of cementitious materials.

Such products can be formed from fiber glass strands of the present invention using techniques known to those of ordinary skill in the art.

Embodiments of the present invention will now be illustrated in the following specific, non-limiting examples.

EXAMPLE 1

Sizing compositions were prepared in accordance with the formulations set forth in Tables 1 and 2. Table 1 includes comparative sizing compositions, while Table 2 includes non-limiting embodiments of sizing compositions of the present invention.

TABLE 1

Formulations of Comparative Sizing Compositions [grams (weight percent solids)]

| Component | A | B | C | D | E | F |
|---|---|---|---|---|---|---|
| Starch[1] | 4300 (41.8%) | 4189 (40.7%) | 3971 (38.5%) | 4143 (40.2%) | 4055 (39.4%) | 3971 (38.5%) |
| Paraffin Wax[2] | 2301 (24.7%) | 2241 (24.0%) | 2125 (22.8%) | 2217 (23.8%) | 2170 (23.3%) | 2125 (22.8%) |
| Oil[3] | 531 (5.7%) | 517 (5.5%) | 490 (5.3%) | 512 (5.5%) | 501 (5.4%) | 490 (5.3%) |
| First Emulsifying Agent[4] | 354 (3.7%) | 345 (3.6%) | 327 (3.4%) | 341 (3.5%) | 334 (3.5%) | 327 (3.4%) |
| Second Emulsifying Agent[5] | 53 (0.6%) | 52 (0.6%) | 49 (0.5%) | 51 (0.5%) | 50 (0.5%) | 49 (0.5%) |
| Non-starch Film Former[6] | 2478 (8.0%) | 2413 (7.8%) | 2288 (7.4%) | 2387 (7.7%) | 2336 (8.0%) | 2288 (7.4%) |
| Acetic Acid[7] | 17.7 (0.0%) | 34.5 (0.0%) | 71.9 (0.0%) | 112.5 (0.0%) | 150.2 (0.0%) | 186.3 (0.0%) |
| Silane[8] | 230 (2.5%) | 465 (5.0%) | 932 (7.5%) | | | |
| Silane[9] | | | | 1125 (6.0%) | 1502 (8.0%) | 1863 (10.0%) |
| First Cationic Lubricant[10] | 825 (3.2%) | 803 (3.1%) | 762 (2.9%) | 795 (3.1%) | 778 (3.0%) | 762 (2.9%) |
| Anti-Foaming Agent[11] | 60 (0.6%) | 59 (0.6%) | 56 (0.6%) | 58 (0.6%) | 57 (0.6%) | 56 (0.6%) |
| Acetic Acid[12] | 198 (0.0%) | 193 (0.0%) | 183 (0.0%) | 191 (0.0%) | 187 (0.0%) | 183 (0.0%) |
| Second Cationic Lubricant[13] | 757 (8.1%) | 738 (7.9%) | 699 (7.5%) | 730 (7.8%) | 714 (7.7%) | 699 (7.5%) |
| Anti-Static Agent[14] | 321 (1.2%) | 312 (1.2%) | 296 (1.1%) | 309 (1.2%) | 302 (1.1%) | 296 (1.1%) |
| Biocide[15] | 2.0 (0.0%) | 2.0 (0.0%) | 2.0 (0.0%) | 2.0 (0.0%) | 2.0 (0.0%) | 2.0 (0.0%) |
| pH | 5.1 | 5.1 | 5.1 | 5.1 | 5.1 | 5.1 |
| Total Percent Solids (Theoretical) | 6.3 | 6.3 | 6.3 | 6.3 | 6.3 | 6.3 |

[1]CATO 75 cationic starch from National Starch and Chemical Co.
[2]PACEMAKER P30 paraffin wax from CITGO Petroleum Corp.
[3]CT 7000 soybean oil from C & T Refinery, Inc.
[4]TMAZ 81 ethylene oxide derivative of a sorbitol ester from BASF Corp.
[5]Macol OP-10 ethoxylated alkylphenol.
[6]PVP K-30 polyvinyl pyrrolidone from ISP Chemicals of Wayne, NJ.
[7]Generic glacial acetic acid.
[8]A-174 gamma-methacryoxypropyltrimethoxysilane from GE Advanced Materials - Silicones (formerly OSi Specialties).
[9]A-1387 silylated polyazamide silane from GE Advance Materials - Silicones (formerly OSi Specialties).
[10]ALUBRASPIN 261 alkyl imidazoline derivative from BASF Corp.
[11]MAZU DF-136 from BASF Corp.
[12]Generic glacial acetic acid.
[13]VERSAMID 140 polyamide resin from Cognis Corp.
[14]KATAX 6661-A anti-static agent from Cognis Corp.
[15]CL-2141 biocide from ChemTreat Inc

TABLE 2

Formulations of Sizing Compositions [grams (weight percent)]

| Component | 1 | 2 | 3 | 4 | 5 |
|---|---|---|---|---|---|
| Starch[16] | 4300 (41.7%) | 4194 (40.7%) | 3966 (38.5%) | 4055 (39.4%) | 3971 (38.5%) |
| Paraffin Wax[17] | 2301 (24.7%) | 2244 (24.0%) | 2122 (22.8%) | 2170 (23.3%) | 2125 (22.8%) |
| Oil[18] | 531 (5.7%) | 518 (5.5%) | 490 (5.3%) | 501 (5.4%) | 490 (5.3%) |

TABLE 2-continued

Formulations of Sizing Compositions [grams (weight percent)]

| Component | 1 | 2 | 3 | 4 | 5 |
|---|---|---|---|---|---|
| First Emulsifying Agent[19] | 354 (3.7%) | 345 (3.6%) | 326 (3.4%) | 334 (3.5%) | 327 (3.4%) |
| Second Emulsifying Agent[20] | 53 (0.6%) | 52 (0.6%) | 49 (0.5%) | 50 (0.5%) | 49 (0.5%) |
| Non-starch Film Former[21] | 2478 (8.0%) | 2416 (7.8%) | 2285 (7.4%) | 2336 (7.5%) | 2288 (7.4%) |
| Acetic Acid[22] | 53 (0.0%) | 103.6 (0.0%) | 208.9 (0.0%) | 150.2 (0.0%) | 186.3 (0.0%) |
| Silane[23] | 584 (2.5%) | 1156 (5.0%) | 2334 (10.0%) | | |
| Silane[24] | | | | 1502 (8.0%) | 1863 (10.0%) |
| First Cationic Lubricant[25] | 825 (3.2%) | 804 (3.1%) | 761 (2.9%) | 778 (3.0%) | 762 (2.9%) |
| Anti-Foaming Agent[26] | 60 (0.6%) | 59 (0.6%) | 55 (0.6%) | 57 (0.6%) | 56 (0.6%) |
| Acetic Acid[27] | 198 (0.0%) | 193 (0.0%) | 183 (0.0%) | 187 (0.0%) | 183 (0.0%) |
| Second Cationic Lubricant[28] | 757 (8.1%) | 739 (7.9%) | 699 (7.5%) | 714 (7.7%) | 699 (7.5%) |
| Anti-Static Agent[29] | 321 (1.2%) | 313 (1.2%) | 296 (1.1%) | 302 (1.1%) | 296 (1.1%) |
| Biocide[30] | 2.0 (0.0%) | 2.0 (0.0%) | 2.0 (0.0%) | 2.0 (0.0%) | 2.0 (0.0%) |
| pH | 5.1 | 5.1 | 5.1 | 5.1 | 5.1 |
| Total Percent Solids | 6.3 | 6.3 | 6.3 | 6.3 | 6.3 |

[16]CATO 75 cationic starch from National Starch and Chemical Co.
[17]PACEMAKER P30 paraffin wax from CITGO Petroleum Corp.
[18]CT 7000 soybean oil from C & T Refinery, Inc.
[19]TMAZ 81 ethylene oxide derivative of a sorbitol ester from BASF Corp.
[20]Macol OP-10 ethoxylated alkylphenol.
[21]PVP K-30 polyvinyl pyrrolidone from ISP Chemicals of Wayne, NJ.
[22]Generic glacial acetic acid.
[23]Z-6032 N-2-(vinylbenzylamino)-ethyl-3-aminopropyltrimethoxysilane from Dow Corning.
[24]DYNASYLAN® 1172 N-2-(vinylbenzylamino)-ethyl-3-aminopropyltrimethoxysilane from Degussa AG.
[25]ALUBRASPIN 261 alkyl imidazoline derivative from BASF Corp.
[26]MAZU DF-136 from BASF Corp.
[27]Generic glacial acetic acid.
[28]VERSAMID 140 polyamide resin from Cognis Corp.
[29]KATAX 6661-A anti-static agent from Cognis Corp.
[30]CL-2141 biocide from ChemTreat Inc Preparation of Sizing Compositions Each of the sizing compositions in Tables 1 and 2 were generally prepared according to the exemplary procedure described below. The amount of water used to prepare the individual components prior to adding the components to the main mix tank may have varied depending on the technician preparing the sizing composition. The amount of water recited below would be sufficient for preparation of the sizing compositions in Tables 1 and 2. Water was precisely added at the end of the procedure to dilute the sizing composition to the desired final volume.

Fifteen gallons of cold water (60-80° F.) were added to a slurry tank. A slurry tank agitator and recirculation were started, and the specified quantity of starch was added to the slurry tank. The cooking of the starch began. Agitation was started in the main mix tank using an Eppenbach agitator after the Eppenbach head was covered. The starch was heated to a temperature of 255° F. A number of techniques and equipment can be used to cook the starch. In the preparation of the above compositions, the starch solution was heated as it was transferred from the slurry tank to a main mix tank. The temperature control of the main mix tank, prior to transfer of the starch solution, was set at 150° F. and tank agitation was started.

To prepare the wax/oil emulsion, hot water (~175° F.) was added to an emulsion tank to bring the level up to a screen. The emulsion tank temperature controller was set to 175° F.+/−5° F. The specified amount of paraffin wax was added to the emulsion tank. When the temperature reached 175° F. and the paraffin wax had melted, the specified amounts of the oil and the two emulsifying agents were added. Two gallons of hot water (~175° F.) were added to the emulsion tank using a homogenizer and a 20 gallon per minute flowrator. The contents of the emulsion tank were agitated with an Eppenbach agitator for more than sixty seconds. Agitation continued with the homogenizer pressure set at 2500 psi. The contents of the emulsion tank were circulated through the homogenizer and returned to the mix tank. The emulsion was then transferred through the homogenizer at 2500 psi into the main mix tank. The emulsion tank was then flushed with water at ~175° F.

After the wax/oil emulsion was added to the main mix tank, the specified amount of non-starch film-former was added directly to the main mix tank.

To prepare the silane premix, one gallon of cold water (~60-80° F.) was added to a premix tank. The specified amount of acetic acid for the silane (the amount that appears in the row above the silane in Tables 1 and 2) was added to the premix tank. The specified amount of silane was slowly added to the acetic acid solution in the premix tank. The silane premix was then agitated for 20 minutes or until the solution was clear. The silane premix was transferred to the main mix tank after the temperature of the main mix tank went below 160° F.

To prepare the first cationic lubricant, one-half gallon of warm water (145° F.) was added to a premix tank. The temperature controller of the premix tank was set to 145+/−5° F., and the agitator was started. The specified amount of the first cationic lubricant was added to the premix tank and dissolved. The first cationic lubricant premix was transferred to the main mix tank after the temperature of the main mix tank went below 160° F.

After the first cationic lubricant premix was added to the main mix tank, the specified amount of the anti-foaming agent was added directly to the main mix tank.

To prepare a second cationic lubricant premix, one-half gallon of warm water (~145° F.) was added to a premix tank. The temperature controller of the premix tank was set to 145+/−5° F., and the agitator was started. The specified amount of the second cationic lubricant was added to the premix tank. The second cationic lubricant solution was stirred until the solution was clear. The second cationic lubricant premix was then transferred to the main mix tank.

After the second cationic lubricant premix was added to the main mix tank, the specified amount of the anti-static agent was added directly to the main mix tank. The specified amount of biocide was then added directly to the main mix tank.

The main mix tank was then diluted to a final volume of forty gallons with warm water (~145° F.). The lid of the main mix tank was closed and the sizing composition was agitated using the Eppenbach agitator for at least 10 minutes. The final temperature of the sizing composition prior to use in a fiber glass forming operation was 150+/−5° F. The sizing compositions had the weight percent solids and the pH's specified in Tables 1 and 2.

Preparation of Fiber Glass Strands

Each of the sizing compositions in Tables 1 and 2 were applied to a fiber glass strand in the following manner. Fiber glass filaments, having a nominal filament diameter of nine microns ("G filament") were formed using a bushing and then at least partially coated with one of the sizing compositions in Tables 1 and 2 using a sizing applicator. The nominal loss on ignition of the fiber glass was 1.0 weight percent. The fiber glass filaments were gathered into a strand and then wound into a forming package on a winder. After drying using conventional techniques, the forming package was fed to a twist frame where the strand from the forming package was twisted 0.7 turns in the "Z" direction and wound on a bobbin. Five to six bobbins of fiber glass strand at least partially coated with each of the sizing compositions in Tables 1 and 2 were collected for testing (i.e., five to six bobbins of fiber glass coated with each of the eleven compositions in the Tables). The fiber glass product was a G 75 product, meaning the filaments were nominal "G filaments" and a single strand weighed 7,500 yards per pound (~66 tex). The nominal number of filaments in a strand of G-75 is 400.

Measurement of Tensile Strength

The tensile strength of the sized fiber glass strand on each bobbin was measured five times. Depending on whether five or six bobbins of each product were collected, the tensile strength of each fiber glass product was measured 25 or 30 times. The tensile strength of each strand was measured using ASTM D2256-02 ("Standard Test Method for Tensile Properties of Yarns by the Single-Strand Method").

The results are summarized in Table 3 below. The tensile strengths in Table 3 represent the uncoated tensile strengths of the sized fiber glass strands.

TABLE 3

| Formulation | Coupling Agent and Weight % | Number of Measurements | Mean Tensile Strength (pounds) | Standard Deviation |
|---|---|---|---|---|
| A (Comparative) | A-174 - 2.5% | 25 | 9.11 | 0.46 |
| B (Comparative) | A-174 - 5.0% | 25 | 9.21 | 0.44 |
| C (Comparative) | A-174 - 10.0% | 25 | 9.52 | 0.42 |
| D (Comparative) | A-1387 - 6.0% | 30 | 10.23 | 0.69 |
| E (Comparative) | A-1387 - 8.0% | 30 | 10.16 | 0.54 |
| F (Comparative) | A-1387 - 10.0% | 30 | 10.29 | 0.95 |
| 1 | Z-6032 - 2.5% | 25 | 9.54 | 0.37 |
| 2 | Z-6032 - 5.0% | 25 | 10.49 | 0.58 |
| 3 | Z-6032 - 10.0% | 25 | 10.83 | 0.37 |
| 4 | D-1172 - 8.0% | 30 | 11.26 | 0.90 |
| 5 | D-1172 - 10.0% | 30 | 11.45 | 1.13 |

Formulations 1-5 each comprise silanes comprising at least one amine and at least one aryl or arylene group, specifically N-2-(vinylbenzylamino)-ethyl-3-aminopropyltrimethoxysilane. Aside from formulation 1, which utilizes the coupling agent at 2.5 weight percent, each of these sizing compositions, when at least partially coated on a fibers glass strand, resulted in a fiber glass strand having a higher uncoated tensile strength than fiber glass strands at least partially coated with sizing compositions comprising coupling agents with different functionalities. As formulations 1-5 are non-limiting examples of embodiments of the present invention, the higher tensile strengths shown in the above data illustrate one of the advantages of embodiments of the present invention.

EXAMPLE 2

Sizing compositions were prepared in accordance with the formulations set forth in Table 4. In Table 4, formulation G represent a comparative sizing composition while formulations 6-9 represent non-limiting embodiments of sizing compositions of the present invention.

TABLE 4

Formulations of Comparative Sizing Compositions
[grams (weight percent solids)]

| Component | G | 6 | 7 | 8 | 9 |
|---|---|---|---|---|---|
| Starch[31] | 3584 (41.8%) | 3305 (38.5%) | 3309 (38.5%) | 3308 (38.5%) | 3305 (38.5%) |
| Paraffin Wax[32] | 1917 (24.7%) | 1768 (22.7%) | 1770 (22.8%) | 1770 (22.8%) | 1768 (22.8%) |
| Oil[33] | 442 (5.7%) | 408 (5.2%) | 409 (5.3%) | 408 (5.3%) | 408 (5.3%) |
| First Emulsifying Agent[34] | 295 (3.7%) | 272 (3.4%) | 272 (3.4%) | 272 (3.4%) | 272 (3.4%) |
| Second Emulsifying Agent[35] | 44 (0.6%) | 41 (0.5%) | 41 (0.5%) | 41 (0.5%) | 41 (0.5%) |
| Non-starch Film Former[36] | 2065 (8.0%) | 1904 (7.4%) | 1907 (7.4%) | 1906 (7.4%) | 1904 (7.4%) |
| Acetic Acid[37] | 14.7 (0.0%) | 155.1 (0.02%) | 155.3 (0.02%) | 155.2 (0.0%) | 155.1 (0.02%) |
| Silane[38] | 192 (2.5%) | | | | |
| Silane[39] | | 781 (10.0%) | | | |
| Silane[40] | | | 1553 (10.0%) | | |
| Silane[41] | | | | 1552 (10.0%) | |
| Silane[42] | | | | | 1415 (10.0%) |
| First Cationic Lubricant[43] | 687 (3.2%) | 634 (2.9%) | 635 (2.9%) | 634 (2.9%) | 634 (2.9%) |
| Anti-Foaming Agent[44] | 50 (0.6%) | 46 (0.6%) | 46 (0.6%) | 46 (0.6%) | 46 (0.6%) |
| Acetic Acid[45] | 165 (0.02%) | 152 (0.02%) | 153 (0.02%) | 152 (0.0%) | 152 (0.02%) |
| Second Cationic Lubricant[46] | 631 (8.1%) | 582 (7.5%) | 583 (7.5%) | 583 (7.5%) | 582 (7.5%) |
| Anti-Static Agent[47] | 267 (1.2%) | 246 (1.1%) | 247 (1.1%) | 247 (1.1%) | 246 (1.1%) |
| Biocide[48] | 1.5 (0.002%) | 1.5 (0.002%) | 1.5 (0.002%) | 1.5 (0.0%) | 1.5 (0.002%) |
| pH | 5.29 | 4.48 | 4.75 | 4.95 | 5.01 |

TABLE 4-continued

Formulations of Comparative Sizing Compositions
[grams (weight percent solids)]

| Component | G | 6 | 7 | 8 | 9 |
|---|---|---|---|---|---|
| Total Percent Solids (Theoretical) | 7.0 | 7.0 | 7.0 | 7.0 | 7.0 |

[31]CATO 75 cationic starch from National Starch and Chemical Co.
[32]PACEMAKER P30 paraffin wax from CITGO Petroleum Corp.
[33]CT 7000 soybean oil from C & T Refinery, Inc.
[34]TMAZ 81 ethylene oxide derivative of a sorbitol ester from BASF Corp.
[35]Macol OP-10 ethoxylated alkylphenol.
[36]PVP K-30 polyvinyl pyrrolidone from ISP Chemicals of Wayne, NJ.
[37]Generic glacial acetic acid.
[38]A-174 gamma-methacryoxypropyltrimethoxysilane from GE Advanced Materials - Silicones (formerly OSi Specialties).
[39]Y-9669 N-Phenyl-gamma-aminopropyl-trimethoxysilane from GE Advanced Materials - Silicones (formerly OSi Specialties).
[40]DYNASYLAN ® 1172 N-2-(vinylbenzylamino)-ethyl-3-aminopropyltrimethoxysilane from Degussa AG.
[41]DYNASYLAN ® 1161 N-Benzyl-N-aminoethyl-3-aminopropyltrimethoxysilan-Hydrochloride from Degussa AG.
[42]A-1128, which is a silane comprising a benzyl group and one or more amines.
[43]ALUBRASPIN 261 alkyl imidazoline derivative from BASF Corp.
[44]INDUSTROL DF-136 from BASF Corp.
[45]Generic glacial acetic acid.
[46]VERSAMID 140 polyamide resin from Cognis Corp.
[47]KATAX 6661-A anti-static agent from Cognis Corp.
[48]CL-2141 biocide from ChemTreat Inc Preparation of Sizing Compositions Each of the sizing compositions in Table 4 was generally prepared according to the exemplary procedure described below. The amount of water used to prepare the individual components prior to adding the components to the main mix tank may have varied depending on the technician preparing the sizing composition. The amount of water recited below would be sufficient for preparation of the sizing compositions in Table 4. Water was precisely added at the end of the procedure to dilute the sizing composition to the desired final volume.

Fifteen gallons of cold water (60-80° F.) were added to a slurry tank. A slurry tank agitator and recirculation were started, and the specified quantity of starch was added to the slurry tank. The cooking of the starch began. Agitation was started in the main mix tank using an Eppenbach agitator after the Eppenbach head was covered. The starch was heated to a temperature of 255° F. A number of techniques and equipment can be used to cook the starch. In the preparation of the above compositions, the starch solution was heated as it was transferred from the slurry tank to a main mix tank. The temperature control of the main mix tank, prior to transfer of the starch solution, was set at 150° F. and tank agitation was started.

To prepare the wax/oil emulsion, hot water (~175° F.) was added to an emulsion tank to bring the level up to a screen. The emulsion tank temperature controller was set to 175° F.+/−5° F. The specified amount of paraffin wax was added to the emulsion tank. When the temperature reached 175° F. and the paraffin wax had melted, the specified amounts of the oil and the two emulsifying agents were added. Two gallons of hot water (~175° F.) were added to the emulsion tank using a homogenizer and a 20 gallon per minute flowrator. The contents of the emulsion tank were agitated with an Eppenbach agitator for more than sixty seconds. Agitation continued with the homogenizer pressure set at 2500 psi. The contents of the emulsion tank were circulated through the homogenizer and returned to the mix tank. The emulsion was then transferred through the homogenizer at 2500 psi into the main mix tank. The emulsion tank was then flushed with water at 175° F.

After the wax/oil emulsion was added to the main mix tank, the specified amount of non-starch film-former was added directly to the main mix tank.

To prepare the silane premix, one gallon of cold water (~60-80° F.) was added to a premix tank. The specified amount of acetic acid for the silane (the amount that appears in the row above the silane in Table 4) was added to the premix tank. The specified amount of silane was slowly added to the acetic acid solution in the premix tank. The silane premix was then agitated for 20 minutes or until the solution was clear. The silane premix was transferred to the main mix tank after the temperature of the main mix tank went below 160° F.

To prepare the first cationic lubricant, one-half gallon of warm water (145° F.) was added to a premix tank. The temperature controller of the premix tank was set to 145+/−5° F., and the agitator was started. The specified amount of the first cationic lubricant was added to the premix tank and dissolved. The first cationic lubricant premix was transferred to the main mix tank after the temperature of the main mix tank went below 160° F.

After the first cationic lubricant premix was added to the main mix tank, the specified amount of the anti-foaming agent was added directly to the main mix tank.

To prepare a second cationic lubricant premix, one-half gallon of warm water (~145° F.) was added to a premix tank. The temperature controller of the premix tank was set to 145+/−5° F., and the agitator was started. The specified amount of the second cationic lubricant was added to the premix tank. The second cationic lubricant solution was stirred until the solution was clear. The second cationic lubricant premix was then transferred to the main mix tank.

After the second cationic lubricant premix was added to the main mix tank, the specified amount of the anti-static agent was added directly to the main mix tank. The specified amount of biocide was then added directly to the main mix tank.

The main mix tank was then diluted to a final volume of thirty gallons with warm water (~145° F.). The lid of the main mix tank was closed and the sizing composition was agitated using the Eppenbach agitator for at least 10 minutes. The final temperature of the sizing composition prior to use in a fiber glass forming operation was 150+/−5° F. The sizing compositions had the weight percent solids and the pH's specified in Table 4.

Preparation of Fiber Glass Strands

Each of the sizing compositions in Table 4 were applied to a fiber glass strand in the following manner. Fiber glass filaments, having a nominal filament diameter of nine microns ("G filament") were formed using a bushing and then at least partially coated with one of the sizing compositions in Table 4 using a sizing applicator. The nominal loss on ignition of the fiber glass was 1.0 weight percent. The fiber glass filaments were gathered into a strand and then wound into a forming package on a winder. After drying using conventional techniques, the forming package was fed to a twist frame where the strand from the forming package was twisted 1.0 turns in the "Z" direction and wound on a bobbin. Five bobbins of fiber glass strand at least partially coated with each of the sizing compositions in Table 4 were collected for testing (i.e., five to six bobbins of fiber glass coated with each of the eleven compositions in the Tables). The fiber glass product was a G 75 product, meaning the filaments were nominal "G filaments" and a single strand weighed 7,500 yards per pound (~66 tex). The nominal number of filaments in a strand of G-75 is 400.

Measurement of Tensile Strength

The tensile strength of the sized fiber glass strand on each bobbin was measured twenty times. Thus, the tensile strength of each fiber glass product was measured 100 times. The tensile strength of each strand was measured using ASTM D2256-02 ("Standard Test Method for Tensile Properties of Yarns by the Single-Strand Method").

The results are summarized in Table 5 below. The tensile strengths in Table 5 represent the uncoated tensile strengths of the sized fiber glass strands.

TABLE 5

| Formulation | Coupling Agent and Weight % | Number of Measurements | Mean Tensile Strength (pounds) | Standard Deviation |
| --- | --- | --- | --- | --- |
| G (Comparative) | A-174 - 2.5% | 100 | 9.998 | 0.053 |
| 6 | Y-9669 - 10.0% | 100 | 10.36 | 0.049 |
| 7 | D-1172 - 10.0% | 100 | 11.91 | 0.069 |
| 8 | D-1161 - 10.0% | 100 | 11.83 | 0.069 |
| 9 | A-1128 - 10.0% | 100 | 12.04 | 0.071 |

Formulations 6-9 each comprise silanes comprising at least one amine and at least one aryl or arylene group. Each of these sizing compositions, when at least partially coated on a fiber glass strand, resulted in a fiber glass strand having a higher uncoated tensile strength than fiber glass strands at least partially coated with a sizing composition comprising a coupling agent with different functionality (e.g., Formulation G from Table 4). As formulations 6-9 are non-limiting examples of embodiments of the present invention, the higher tensile strengths shown in the above data illustrate one of the advantages of embodiments of the present invention.

The data in Table 5 also suggest that silanes comprising at least two amines, when used as a component in a sizing composition to at least partially coat a fiber glass strand, can result in a fiber glass strand having a higher uncoated tensile strength than fiber glass strands at least partially coated with sizing compositions comprising a silane comprising one amine. Y-9669 silane, used in Formulation 6, comprises a phenyl group and a single amine, whereas D-1161 and A-1128 silanes, used in Formulations 8 and 9, each comprise a benzyl group and two amines. The uncoated tensile strengths of the strands coated with Formulations 8 and 9 were higher than the uncoated tensile strength of the strand coated with Formulation 6.

Embodiments of fiber glass strands of the present invention can be coated with polyvinyl chloride plastisol for use in some applications, such as cement board applications, using techniques known to those of skill in the art. The coated fiber glass strands have exhibited tensile strengths that are at levels desirable to cement board manufacturers.

Coated fiber glass strands can be warped, woven, tenured, and placed in cement board using techniques known to those of skill in the art. Alkali resistance is an important property of the cement board, and cement boards manufactured utilizing embodiments of fiber glass strands of the present invention have demonstrated an alkali resistance that is desirable to cement board manufacturers.

Desirable characteristics, which can be exhibited by the present invention, include, but are not limited to, the provision of sizing compositions that can be compatible with vinyl additional polymers, such as polyvinyl chloride; the provision of fiber glass strands coated with a sizing composition that can be compatible with vinyl additional polymers, such as polyvinyl chloride; the provision of fiber glass strands that can be processed with acceptable break levels during downstream processing; the provision of a sizing composition, that upon at least partially coating fiber glass strand, will result in the fiber glass strand exhibiting a desired tensile strength; the provision of fiber glass strands that can exhibit a desired tensile strength; the provision of a sizing composition, that upon at least partially coating fiber glass strand, will result in the sized fiber glass strand exhibiting a desired tensile strength after coating with a vinyl addition polymer such as polyvinyl chloride; the provision of sized fiber glass strands that can exhibit a desired tensile strength after at least partially coating the sized fiber glass strands with a vinyl addition polymer such as polyvinyl chloride; the provision of sized fiber glass strands that can be used to reinforce cementitious materials, such as cement board, with adequate alkali resistance and desirable strength; and others.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

That which is claimed:

1. A sizing composition for glass fibers, comprising:
    a starch;
    a nonionic lubricant; and
    a silane comprising at least one amine and at least one aryl or arylene group, wherein the silane is present in an amount greater than about 5 percent by weight of the sizing composition on a total solids basis.

2. The sizing composition of claim 1, wherein the silane comprising at least one amine and at least one aryl or arylene group comprises a silane comprising at least one amine and at least one benzyl group.

3. The sizing composition of claim 2, wherein the at least one benzyl group comprises at least one benzylamino group.

4. The sizing composition of claim 3, wherein the silane further comprises a second amine.

5. The sizing composition of claim 1, wherein the silane comprising at least one amine and at least one aryl or arylene group comprises a silane comprising at least one amine and at least one phenyl group.

6. The sizing composition of claim 5, wherein the at least one phenyl group comprises at least one phenylamino group.

7. The sizing composition of claim 6, wherein the silane further comprises a second amine.

8. The sizing composition of claim 1, wherein the silane comprising at least one amine and at least one aryl or arylene group comprises a silane comprising at least one amine and at least one arylene group.

9. The sizing composition of claim 8, wherein the silane comprises terminal unsaturation.

10. The sizing composition of claim 9, wherein the at least one arylene group comprises a vinylbenzyl group.

11. The sizing composition of claim 9, wherein the at least one arylene group comprises a vinylbenzylamino group.

12. The sizing composition of claim 11, wherein the silane further comprises a second amine.

13. The sizing composition of claim 1, wherein the silane comprises at least one amine and at least one arylene group and wherein the silane is terminally unsaturated.

14. The sizing composition of claim 1, wherein the silane comprises two or more amines.

15. The sizing composition of claim 14, wherein the two or more amines comprise at least two secondary amines.

16. The sizing composition of claim 1, wherein the silane comprises greater than about 10 percent by weight of the sizing composition on a total solids basis.

17. The sizing composition of claim 1, wherein the nonionic lubricant comprises wax.

18. The sizing composition of claim 17, further comprising a second nonionic lubricant and wherein the second nonionic lubricant comprises oil.

19. The sizing composition of claim 1, wherein the nonionic lubricant comprises oil.

20. A sizing composition for glass fibers, comprising:
a starch in an amount greater than 30 weight percent of the sizing composition on a total solids basis; and
a silane comprising at least one amine and at least one aryl or arylene group in an amount greater than about 5 percent by weight of the sizing composition on a total solids basis.

21. The sizing composition of claim 20, wherein the silane comprises greater than about 10 percent by weight of the sizing composition on a total solids basis.

22. A sizing composition for glass fibers, comprising:
a starch in an amount greater than about thirty-five weight percent of the sizing composition on a total solids basis;
a paraffin wax in an amount greater than about twenty weight percent of the sizing composition on a total solids basis;
an oil in an amount greater than about five weight percent of the sizing composition on a total solids basis; and
a silane comprising at least one amine and at least one aryl or arylene group in an amount greater than about five weight percent of the sizing composition on a total solids basis.

23. A fiber glass strand comprising at least one glass fiber at least partially coated with a sizing composition, the sizing composition comprising:
a starch;
a nonionic lubricant; and
a silane comprising at least one amine and at least one aryl or arylene group, wherein the silane is present in an amount greater than about 5 percent by weight of the sizing composition on a total solids basis.

24. The fiber glass strand of claim 23, wherein the fiber glass strand has an uncoated tensile strength of about nine pounds or more.

25. The fiber glass strand of claim 23, wherein the fiber glass strand has an uncoated tensile strength of about ten pounds or more.

26. The fiber glass strand of claim 23, wherein the fiber glass strand has an uncoated tensile strength of about eleven pounds or more.

27. A cement board comprising at least one fiber glass strand according to claim 23.

28. A sizing composition for glass fibers comprising:
a starch; and
a silane comprising at least one amine and at least one aryl or arylene group, wherein the starch is present in an amount ranging from about 30 to about 45 weight percent of the sizing composition on a total solids basis and wherein the silane is present in an amount greater than about 5 percent by weight of the sizing composition on a total solids basis.

29. The sizing composition of claim 20 further comprising a lubricant.

30. The sizing composition of claim 29, wherein the lubricant comprises a nonionic lubricant, a cationic lubricant, or mixtures thereof.

31. The sizing composition of claim 1, wherein the silane comprises greater than about 8 percent by weight of the sizing composition on a total solids basis.

32. The sizing composition of claim 20, wherein the silane comprises greater than about 8 percent by weight of the sizing composition on a total solids basis.

33. The sizing composition of claim 22, wherein the silane comprises greater than about 8 percent by weight of the sizing composition on a total solids basis.

34. The fiber glass strand of claim 23, wherein the silane comprises greater than about 8 percent by weight of the sizing composition on a total solids basis.

35. The sizing composition of claim 28, wherein the silane comprises greater than about 8 percent by weight of the sizing composition on a total solids basis.

36. The sizing composition of claim 28, wherein the silane comprises greater than about 10 percent by weight of the sizing composition on a total solids basis.

37. A forming package comprising at least one fiber glass strand of claim 23.

* * * * *